US011994278B2

(12) United States Patent
Halliwell

(10) Patent No.: US 11,994,278 B2
(45) Date of Patent: May 28, 2024

(54) LIGHTING DEVICE OR LAMP WITH CONFIGURABLE BEAM ANGLE AND/OR PROFILE

(71) Applicant: Feit Electric Company, Inc., Pico Rivera, CA (US)

(72) Inventor: Brian Halliwell, Pico Rivera, CA (US)

(73) Assignee: Feit Electric Company, Inc., Pico Rivera, CA (US)

( * ) Notice: Subject to any disclaimer, the term of this patent is extended or adjusted under 35 U.S.C. 154(b) by 0 days.

(21) Appl. No.: 18/177,867

(22) Filed: Mar. 3, 2023

(65) Prior Publication Data

US 2023/0204199 A1 Jun. 29, 2023

Related U.S. Application Data

(63) Continuation of application No. 16/936,658, filed on Jul. 23, 2020, now Pat. No. 11,619,373, which is a continuation of application No. 15/496,305, filed on Apr. 25, 2017, now Pat. No. 10,794,578.

(51) Int. Cl.

| | |
|---|---|
| ***F21S 8/02*** | (2006.01) |
| ***F21V 5/00*** | (2018.01) |
| ***F21V 14/06*** | (2006.01) |
| ***F21V 17/02*** | (2006.01) |
| ***F21V 23/04*** | (2006.01) |
| *F21S 10/00* | (2006.01) |
| *F21V 14/08* | (2006.01) |
| *F21Y 115/10* | (2016.01) |

(52) U.S. Cl.
CPC .......... *F21V 23/0435* (2013.01); *F21S 8/026* (2013.01); *F21V 5/007* (2013.01); *F21V 14/06* (2013.01); *F21V 17/02* (2013.01); *F21S 10/00* (2013.01); *F21V 14/08* (2013.01); *F21Y 2115/10* (2016.08)

(58) Field of Classification Search
CPC ........................................................ F21V 5/007
See application file for complete search history.

(56) References Cited

U.S. PATENT DOCUMENTS

| | | | | |
|---|---|---|---|---|
| 6,474,837 | B1 * | 11/2002 | Belliveau | F21V 14/08 362/232 |
| 6,866,401 | B2 | 3/2005 | Sommers et al. | |
| 8,044,608 | B2 | 10/2011 | Kuo et al. | |
| 8,076,867 | B2 | 12/2011 | Kuo et al. | |
| 8,111,017 | B2 | 2/2012 | Lin et al. | |
| 8,305,013 | B2 | 11/2012 | Lin et al. | |
| 8,378,588 | B2 | 2/2013 | Kuo et al. | |
| 8,378,589 | B2 | 2/2013 | Kuo et al. | |

(Continued)

*Primary Examiner* — Zheng Song
(74) *Attorney, Agent, or Firm* — Alston & Bird LLP

(57) ABSTRACT

A lighting device or lamp having two or more operating modes are provided. The lighting device or lamp comprises a housing having one or more light emitting diode (LED) packages mounted therein. The lighting device or lamp further comprises at least one secondary optic disc comprising a plurality of secondary optical elements. The secondary optical elements comprise two or more types of secondary optical elements. An operating mode of the two or more operating modes corresponds to each of the one or more LED packages being aligned with a secondary optical element of a predetermined type. The secondary optic disc is mounted to the housing so that the secondary optic disc is selectively rotatable with respect to the housing.

20 Claims, 10 Drawing Sheets

(56) References Cited

U.S. PATENT DOCUMENTS

| | | | | |
|---|---|---|---|---|
| 8,482,219 | B2 | 7/2013 | Kuo et al. | |
| 8,508,150 | B2 | 8/2013 | Kuo et al. | |
| 8,956,014 | B2 | 2/2015 | Jurik et al. | |
| 9,030,122 | B2 | 5/2015 | Yan et al. | |
| 9,232,591 | B2 | 1/2016 | Kuo et al. | |
| 9,253,843 | B2 | 2/2016 | Lee et al. | |
| 9,386,653 | B2 | 7/2016 | Kuo et al. | |
| 9,470,405 | B2 | 10/2016 | Boccoleri et al. | |
| 9,587,805 | B2 | 3/2017 | Ryu et al. | |
| 9,781,793 | B2 | 10/2017 | Yan et al. | |
| 9,964,286 | B1 * | 5/2018 | Sooferian | F21V 9/40 |
| 10,794,578 | B2 | 10/2020 | Halliwell | |
| 11,619,373 | B2 | 4/2023 | Halliwell | |
| 2008/0273324 | A1 * | 11/2008 | Becker | F21V 14/06 362/237 |
| 2010/0061090 | A1 | 3/2010 | Bergman et al. | |
| 2010/0265706 | A1 | 10/2010 | Hsing Chen et al. | |
| 2011/0261568 | A1 | 10/2011 | Dalsgaard | |
| 2013/0003372 | A1 | 1/2013 | Dalsgaard | |
| 2013/0107513 | A1 | 5/2013 | Lundberg et al. | |
| 2013/0265756 | A1 | 10/2013 | Christoffersen | |
| 2014/0321135 | A1 | 10/2014 | Chen et al. | |
| 2014/0355264 | A1 * | 12/2014 | Chinniah | F21K 9/65 362/241 |
| 2015/0131288 | A1 | 5/2015 | Zhang | |
| 2015/0211708 | A1 | 7/2015 | Stavely et al. | |
| 2015/0323160 | A1 * | 11/2015 | Duguid | F21V 14/045 362/326 |
| 2016/0069540 | A1 * | 3/2016 | Kjeldsen | F21S 10/007 362/232 |
| 2017/0082254 | A1 | 3/2017 | Zhang | |
| 2017/0191631 | A1 * | 7/2017 | Lentine | F21V 23/045 |
| 2017/0205051 | A1 | 7/2017 | Jorgensen | |
| 2017/0241623 | A1 | 8/2017 | Zhang | |
| 2017/0268748 | A1 | 9/2017 | Jorgensen | |
| 2018/0119908 | A1 | 5/2018 | Chien | |
| 2018/0306412 | A1 | 10/2018 | Halliwell | |
| 2020/0348014 | A1 | 11/2020 | Halliwell | |

* cited by examiner

LIGHTING DEVICE OR LAMP WITH CONFIGURABLE BEAM ANGLE AND/OR PROFILE

CROSS-REFERENCE TO RELATED APPLICATIONS

This application is a continuation of U.S. application Ser. No. 16/936,658, filed Jul. 23, 2020, which is a continuation of U.S. application Ser. No. 15/496,305, filed Apr. 25, 2017, which are hereby incorporated herein in their entireties.

BACKGROUND

Directional lamps and lighting devices and/or fixtures are used in a variety of lighting applications. For example, directional lamps, such as parabolic aluminized reflector (PAR), multi-faceted reflector (MR), bulged reflector (BR), and reflector (R) lamps, are used in recess lighting applications and track lighting applications. Directional lamps provide light that is characterized by a beam angle and profile. Based on the lighting application, different beam angles or profiles may be desired. For example, the height of the ceiling into which a recessed lighting fixture is installed and/or the geometry of an array of recessed lighting fixtures may dictate the beam angle and/or profile necessary to provide a desirable amount of light and/or light spread from the recessed lighting fixture(s). In another example, whether the lighting application is residential or commercial may affect the amount of light and/or light spread that is desirable.

Available recessed retrofit lighting devices and/or lamps for recessed lighting applications or other directional lighting applications provide light having a specific beam angle, typically referred to as a spot light, narrow beam flood or wide angle flood. This requires that the user know the desired beam angle before the purchase of a lighting device or lamp and does not provide the user with flexibility once the lighting device or lamp is installed.

Therefore, there is a need in the art for retrofit lighting devices and/or direction lamps that allow users to adjust the beam angle and/or profile provided thereby.

BRIEF SUMMARY

Embodiments of the present invention provide a retrofit lighting device or directional lamp (e.g., PAR, MR, BR, or R lamp) for which the beam angle and/or beam profile of the light emitted from the retrofit lighting device or directional lamp is configurable and/or adjustable. For example, the retrofit lighting device or directional lamp may comprise two or more predetermined operating modes. In an example embodiment, the predetermined operating modes may each correspond to a particular position of one or more secondary optic discs each comprising a plurality of secondary optical elements. For example, in an example embodiment, the retrofit lighting device or directional lamp comprises one or more LED packages and each LED package corresponds to a group of secondary optical elements. In an example embodiment, a group of secondary optical elements comprises two or more (e.g., three) secondary optical elements that are configured to, when aligned with the corresponding LED package, condition the light emitted by the corresponding LED package to provide a beam of a predefined beam angle and/or profile. For example, a secondary optics disc may comprise one or more groups and/or portions of one or more groups of secondary optical elements that each correspond to an LED package of a lighting device or lamp. Each group may comprise one or more types of secondary optical elements. The secondary optic disc may be rotated to align each LED package with a particular type of secondary optical element of the corresponding group of secondary optical elements. In one example embodiment, each of the particular type of secondary optical elements may be configured to condition the light emitted by the corresponding LED package to provide a beam of the same pre-defined beam angle. In an example embodiment, the particular type of secondary optical elements may be configured to condition the light emitted by the corresponding LED package such that the beam provided by the lighting device and/or lamp (e.g., the combination of the beams emitted by each of the LED packages) is a cohesive beam of a pre-defined beam angle and/or beam profile.

According to one aspect of the present invention, a lighting device or lamp is provided. In an example embodiment, the lighting device or lamp comprises a housing having one or more light emitting diode (LED) packages mounted therein. The lighting device or lamp further comprises at least one secondary optic disc comprising a plurality of secondary optical elements. The secondary optical elements comprise two or more types of secondary optical elements. An operating mode of the two or more operating modes corresponds to each of the one or more LED packages being aligned with a secondary optical element of a predetermined type. The secondary optic disc is mounted to the housing so that the secondary optic disc is selectively rotatable with respect to the housing.

In an example embodiment, a first operating mode of the two or more operating modes (a) corresponds to the secondary optical elements of a first type being aligned with the LED packages and (b) is defined by a first beam angle and first beam profile and a second operating mode of the two or more operating modes (a) corresponds to the secondary optical elements of a second type being aligned with the LED packages and (b) is defined by a second beam angle and second beam profile. At least one of (a) the first beam angle and the second beam angle are different, (b) the first beam profile and the second beam profile are different, or (c) the first beam angle and the second beam angle are different and the first beam profile and the second beam profile are different. The secondary optic disc is rotatable between at least a first position corresponding to the secondary optical elements of the first type being aligned with the LED packages and a second position corresponding to the secondary optical elements of the second type being aligned with the LED packages.

According to another aspect of the present invention, a lighting device or lamp is provided. The lighting device or lamp comprises a housing having one or more light engines mounted therein. The lighting device or lamp further comprises at least one secondary optic disc comprising a plurality of secondary optical elements, wherein the secondary optical elements comprise two or more types of secondary optical elements. An operating mode of the two or more operating modes corresponds to each of the one or more light engines being aligned with a secondary optical element of a predetermined type. The secondary optic disc is mounted to the housing so that the secondary optic disc is selectively moveable with respect to the housing. Additionally, movement of the secondary optic disc from a first position to a second position causes a switching of the operating mode of the lighting device or lamp from a first operating mode to a second operating mode.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6A:
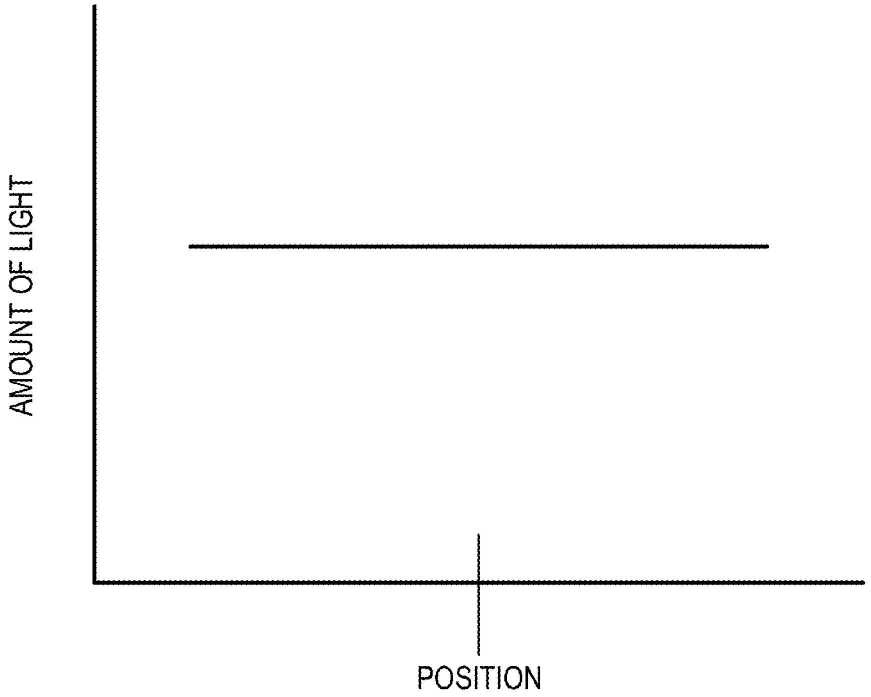
Figure 6B:
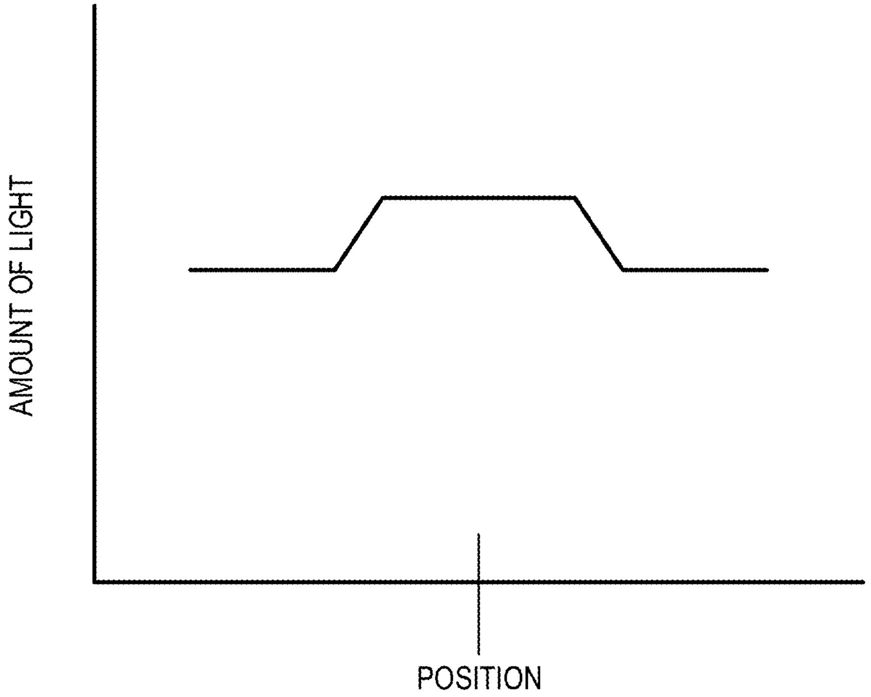
Figure 7:
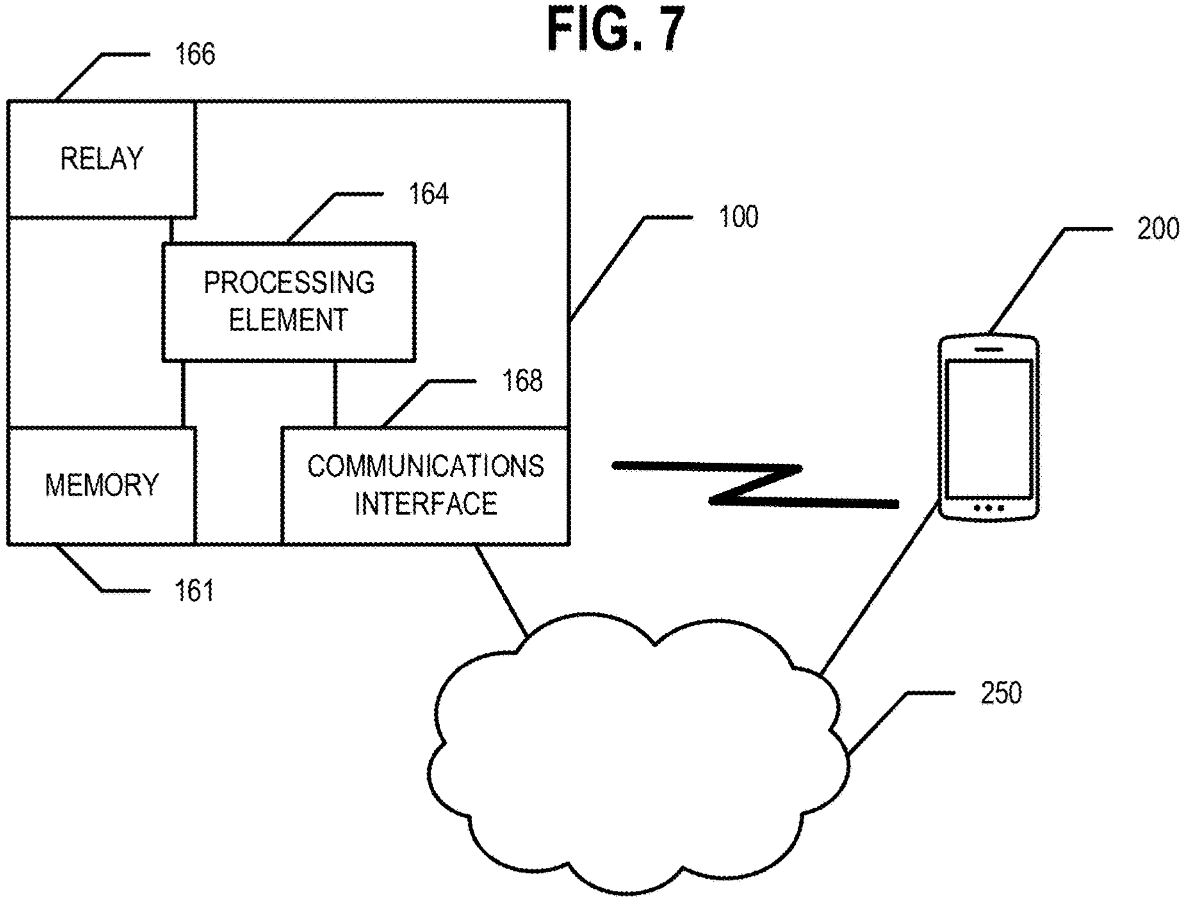
Figure 8:
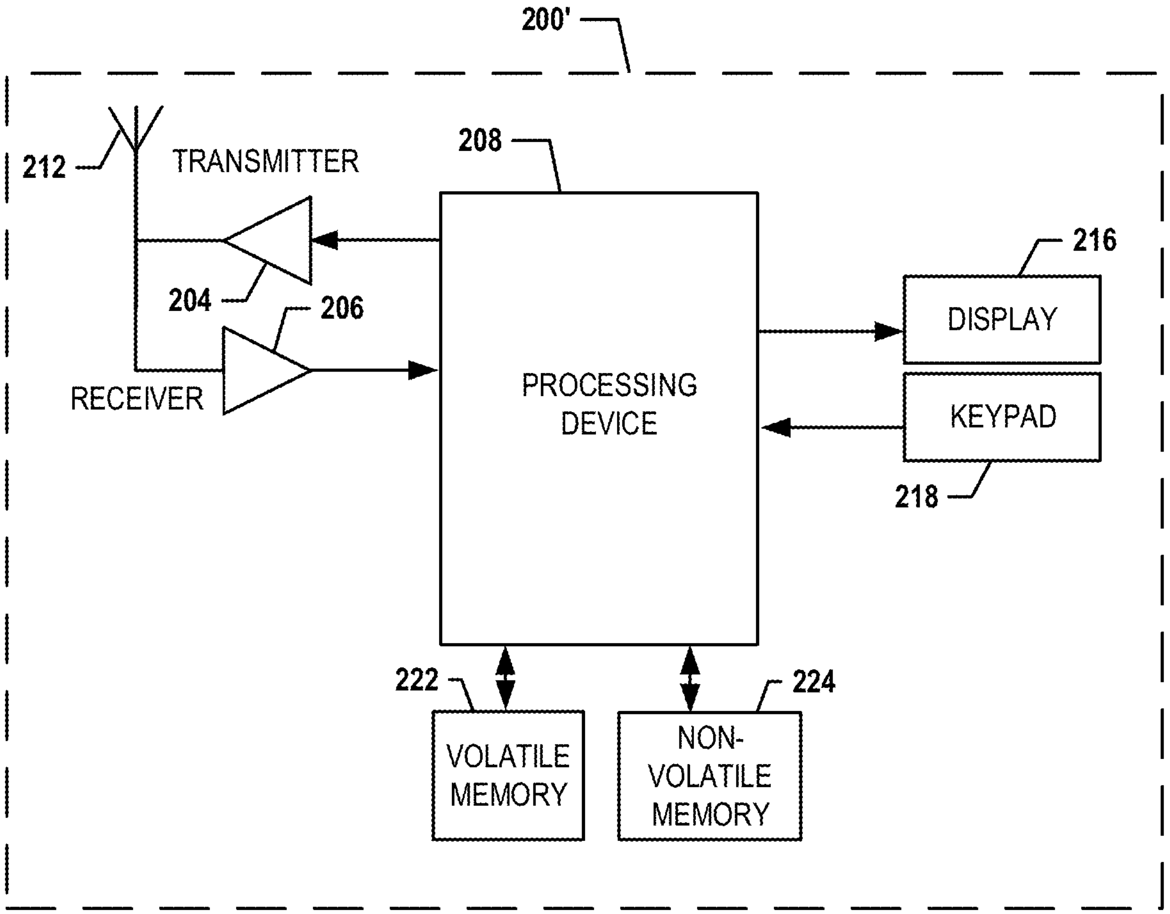
Figure 9:
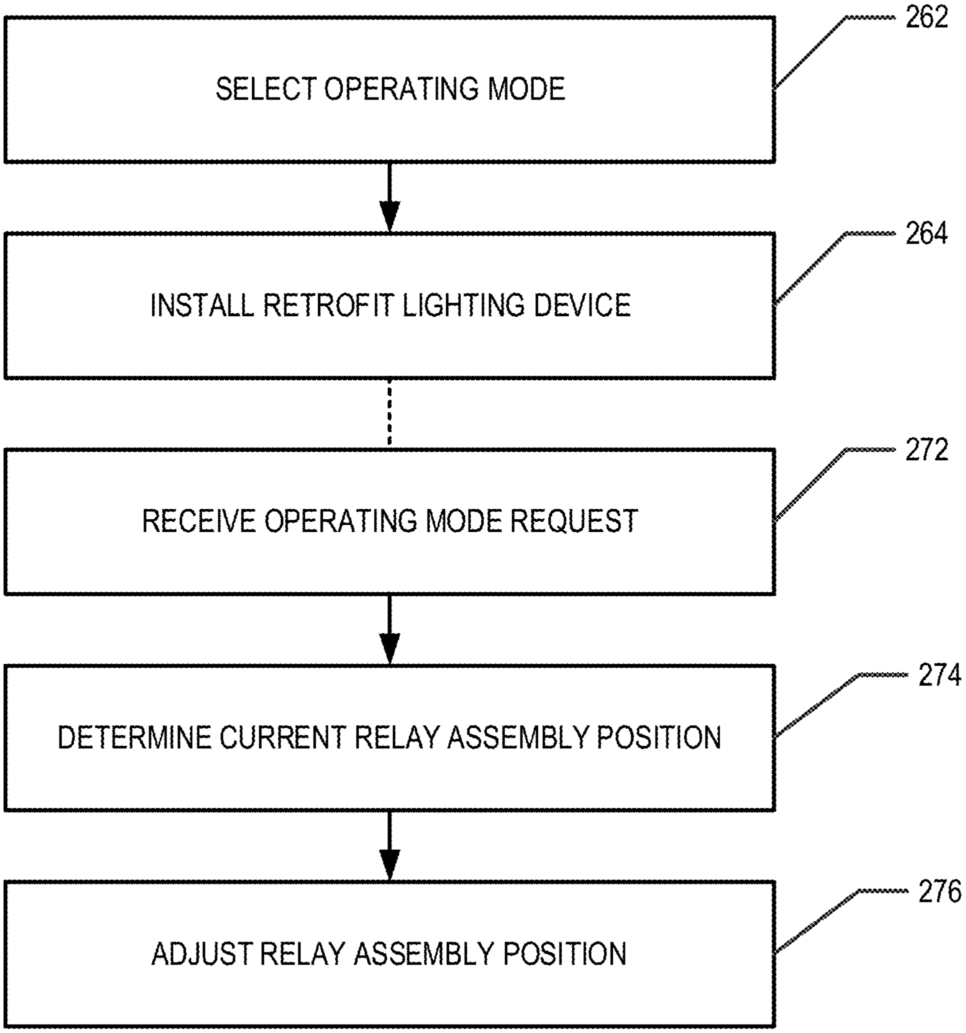
Figure 10:
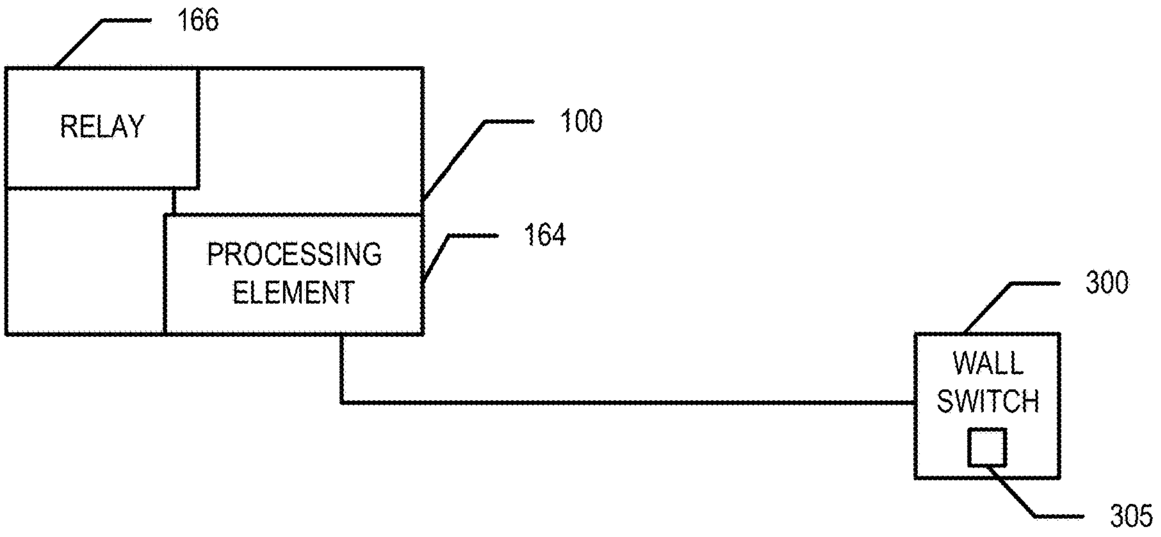
Figure 11:
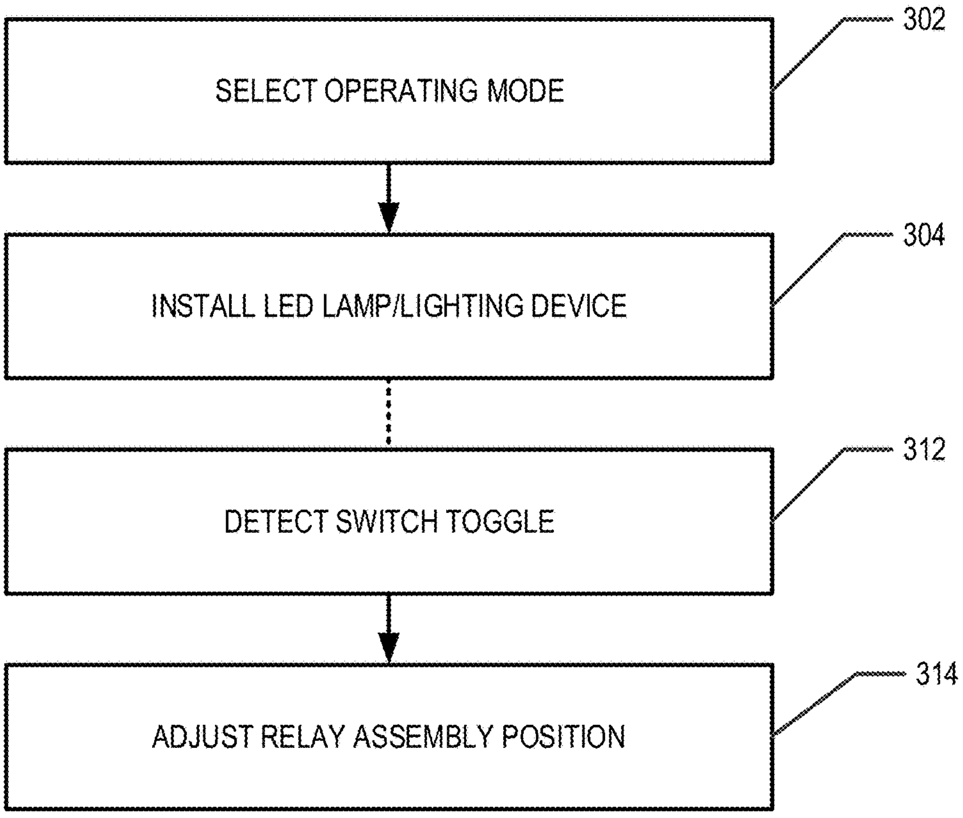

FIGS. 6A and 6B each illustrate an example beam profile, in accordance with an example embodiment of the present invention;

FIG. 7 is a block diagram of a retrofit lighting device in wireless communication with a remote switch, in accordance with an example embodiment of the present invention;

FIG. 8 is a block diagram of a computing entity that may be used as a wireless remote switch in communication with an LED lamp or LED lighting device, in accordance with an example embodiments of the present invention;

FIG. 9 provides a flowchart illustrating processes and procedures of installing and operating a retrofit lighting device using a wireless remote switch, in accordance with an example embodiment of the present invention;

FIG. 10 is a block diagram of a retrofit lighting device in wired communication with a remote switch, in accordance with an example embodiment of the present invention; and FIG. 11 provides a flowchart illustrating processes and procedures of installing and operating a retrofit lighting device using a wired remote switch, in accordance with an example embodiment of the present invention.

DETAILED DESCRIPTION OF VARIOUS EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like numbers refer to like elements throughout.

Example embodiments of the present invention provide a directional lamp or lighting device or fixture having a configurable and/or selectable beam angle and/or beam profile. Various example embodiments are discussed below with respect to a retrofit trim lighting device, however it should be understood that aspects of the present invention may be embodied in a directional lamp (e.g., a PAR, MR, BR, or R lamp) and/or other lighting device configured to emit a beam of light (e.g., a directional lighting device). For example, an embodiment of the present invention provides an MR16 lamp having a configurable and/or selectable beam angle and/or beam profile.

Figure 1:
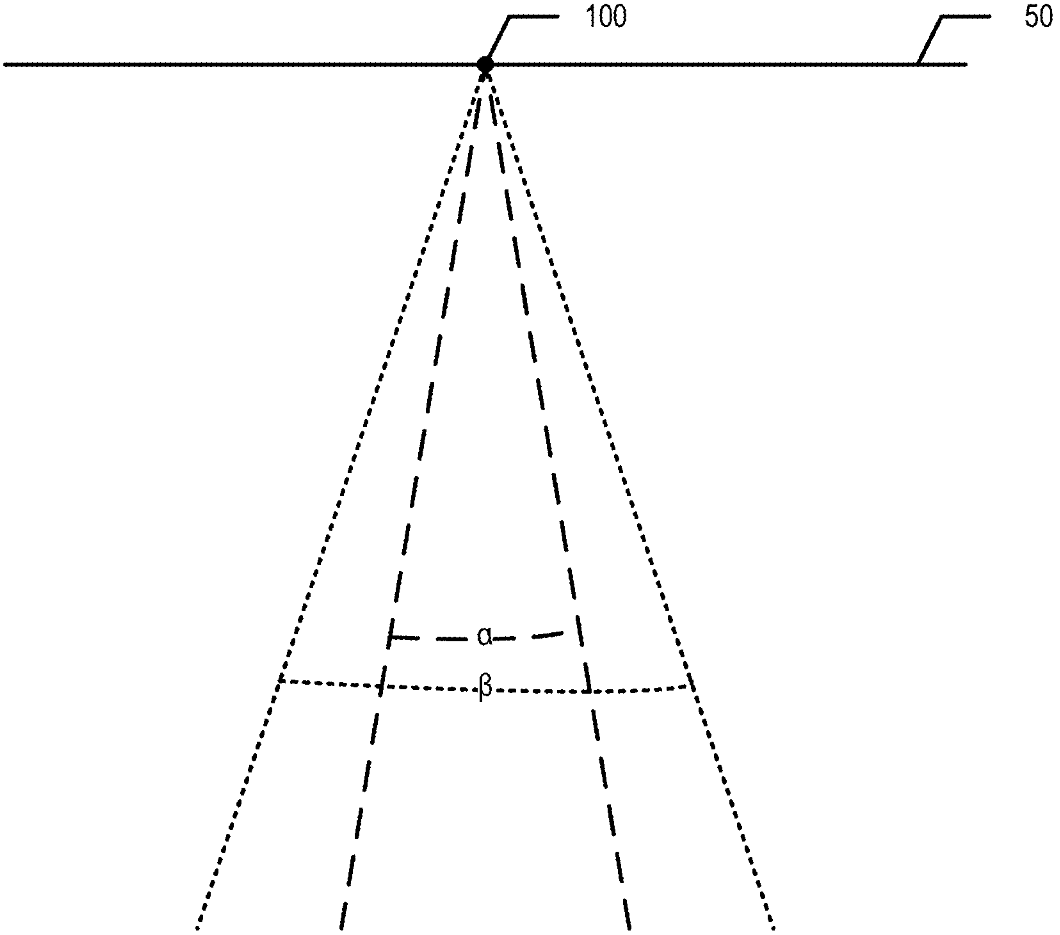
FIG. 1 is a schematic view of a retrofit lighting device having a configurable beam angle, in accordance with an example embodiment of the present invention.

FIG. 1 illustrates an example retrofit lighting device 100 installed in a ceiling or other mounting surface 50. The retrofit lighting device 100 may be configured to emit a beam of light according to a selected operating mode. Each operating mode of the retrofit lighting device 100 may be defined by a beam angle and a beam profile of the beam of light emitted by the retrofit lighting device 100 when operated. For example, the retrofit lighting device 100 that may be configured to emit a beam of light having a first beam angle $\alpha$, as indicated by the dashed lines, or a second beam angle $\beta$, as indicted by the dotted lines. Various embodiments may provide various numbers of selectable beam angles and/or profiles available for user selection. For example, various embodiments, may provide a user with two to eight pre-defined selectable operating modes, each defined by a beam angle and/or beam profile. In an example embodiment, a retrofit lighting device 100 may be configured to have three different selectable beam angles. For example, the retrofit lighting device 100 may be configured to have a first selectable angle that is in the range of 5-45°, a second selectable angle that is in the range of 35-80°, and a third selectable angle that is in the range of 70-120°. For example, in one embodiment, a retrofit lighting device 100 may be configured such that a user may select for the retrofit lighting device to emit a beam of light having a beam angle of 40°, 60°, or 100°. In an example embodiment, the retrofit lighting device 100 may have one or more operating modes defined by a beam angle (e.g., a user selected beam angle) and a generally uniform and/or constant beam profile, as illustrated in FIG. 6A. In an example embodiment, a beam profile describes the amount of light along a diameter of the beam of light in a plane that is transverse to the direction of propagation of the beam of light. In an example embodiment, the retrofit lighting device 100 may have one or more operating modes defined by a beam angle (e.g., a user selected beam angle) and a non-uniform and/or non-constant beam profile. For example, the retrofit lighting device 100 may have an operating mode in which the emitted beam of light comprises an outer beam defined by an outer beam angle and an inner beam defined by an inner beam angle, wherein the outer beam angle is larger than the inner beam angle, as illustrated in FIG. 6B. For example, an inner portion of the beam may comprise more or less light than an outer portion of the beam. Thus, the retrofit lighting device may comprise a plurality of secondary optical elements that may be used to provide a light beam corresponding to a selected one of two or more operating modes, wherein each operating mode is defined by a beam angle and a beam profile.

In an example embodiment, the retrofit lighting device 100 may comprise a plurality of secondary optical elements. Each secondary optical element may correspond to a light engine of the retrofit lighting device 100. Each operating mode may correspond to a set of secondary optical elements, such that when the set of secondary optical elements are aligned with the corresponding light engines, the light emitted by the corresponding light engine and/or the light emitted by the retrofit lighting device 100 is a beam of light having a predefined beam angle and/or beam profile. In an example embodiment, the retrofit lighting device 100 comprises two or more light engines such that when a plurality of a secondary optical elements are each aligned with the corresponding light engine, a beam of a predetermined beam angle and/or beam profile is provided by the retrofit lighting device 100 during operation thereof. For example, a first set of secondary optical elements may correspond to a first beam angle and a first operating mode and a second set of secondary optical elements may correspond to a second beam angle and a second operating mode. When the first operating mode is selected (e.g., by a user via a selector or a wired or wireless remote switch), the secondary optical elements of the first set are aligned with their corresponding light engines and a light beam having a first beam angle and a first beam profile is emitted and when the secondary optical elements of the second set are aligned with their corresponding light engines a light beam having a second beam angle and/or second beam profile is emitted. In an example embodiment, the first beam angle and the second beam angle are different, the first beam profile and the second beam profile are different, or the first beam angle and the second beam angle are different and the first beam profile and the second beam profile are different.

In an example embodiment, the retrofit lighting device 100 may comprise one or more complex secondary optics and/or a secondary optic discs. For example, a secondary optic disc may comprise a plurality of secondary optical elements. In one example embodiment, a first secondary optic disc comprises a first plurality of secondary optical elements and a second secondary optic disc comprises a second plurality of secondary optical elements. In an example embodiment, one or secondary optic discs each comprising one or more secondary optical elements may be rotated to align lighting engines of the retrofit lighting device 100 with one or more of the secondary optical elements such that light emitted by the retrofit lighting device is conditioned to have a particular beam angle and/or beam profile. In an example embodiment, the one or more light engines may be one or more light emitting diode (LED) packages. In an example embodiment, the retrofit lighting device 100 only comprises one secondary optic disc.

In an example embodiment, a user may cause the one or more secondary optic discs to rotate such that a set of secondary optical elements may be aligned or unaligned with the one or more light engines by manually rotating, for example, a selector on the housing of the retrofit lighting device 100. In an example embodiment, a user may use a wired or wireless remote switch (e.g., wall switch, application operating on a mobile phone, and/or the like) to cause rotation of the one or more secondary optic discs to align or unalign one or more sets of secondary optical elements with the corresponding light engines. In an example embodiment, a remote switch may be a wall mounted switch mounted in the same room as the retrofit lighting device 100 and/or within a short range communication technology range of the retrofit lighting device 100. In another example, the remote switch may be a handheld device (e.g., a remote control, smartphone, tablet, and/or the like) that is within the same room as the retrofit lighting device 100, within a short range communication technology range of the retrofit lighting device, and/or in communication with the retrofit lighting device through a wireless network. Various aspects of some example embodiments will now be described in more detail.

Each secondary optical element is associated with a group, a type, and one or more sets. Each secondary optical element is associated with a group of secondary optical elements. Each group of secondary optical elements corresponds to a light engine of the retrofit lighting device. Thus, the group of the secondary optical element indicates which light engine the secondary optical element corresponds to. The type corresponds to the beam angle of the beam of light resultant from the secondary optical element conditioning the light emitted by the corresponding light engine. Thus, the type corresponds to the optical properties of the secondary optical element. Additionally, each secondary optical element is associated with one or more sets. When a set of secondary optical elements are each aligned with the corresponding light engine, a light beam in accordance with a predetermined operating mode is provided by the retrofit lighting device 100 when operated. Thus, the one or more sets associated with secondary optical element are the one or more operating modes in which the secondary optical element is aligned with the corresponding light engine.

Example Retrofit Lighting Device

Figure 2:
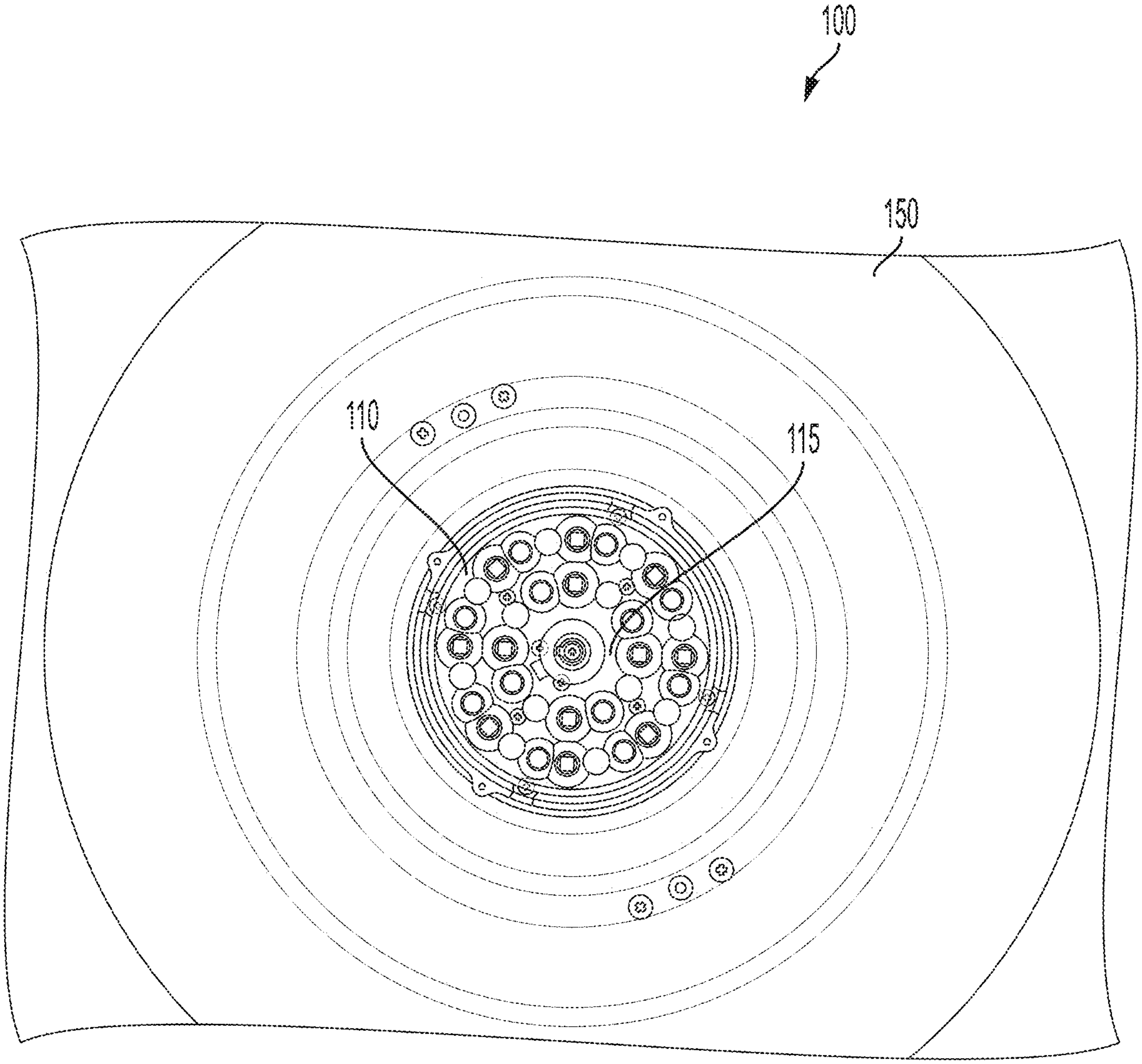
FIG. 2 is a front view of an example retrofit lighting device, in accordance with an example embodiment of the present invention.
Figure 3:
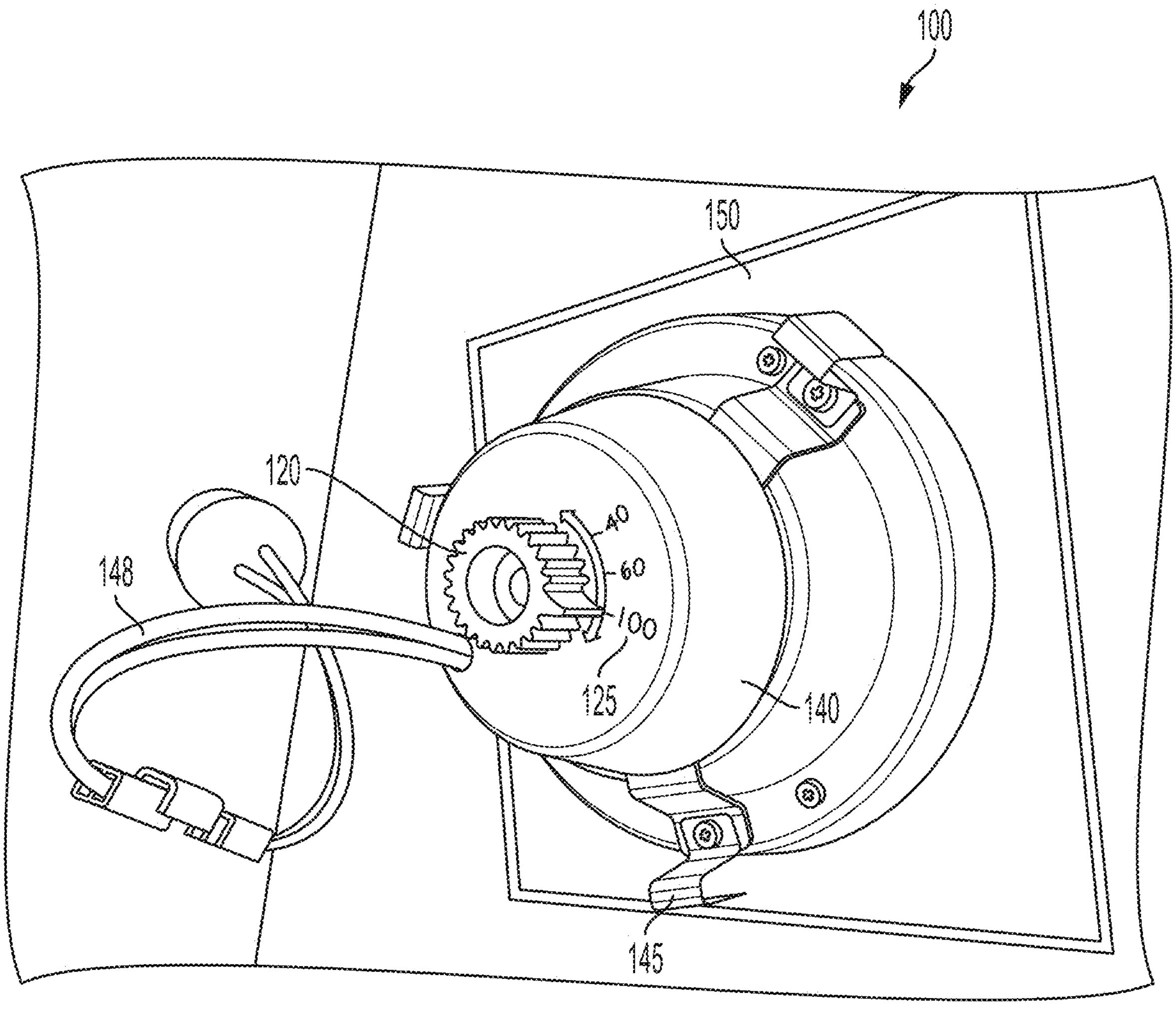
FIG. 3 is a back perspective view of an example retrofit lighting device, in accordance with an example embodiment of the present invention.
Figure 4:
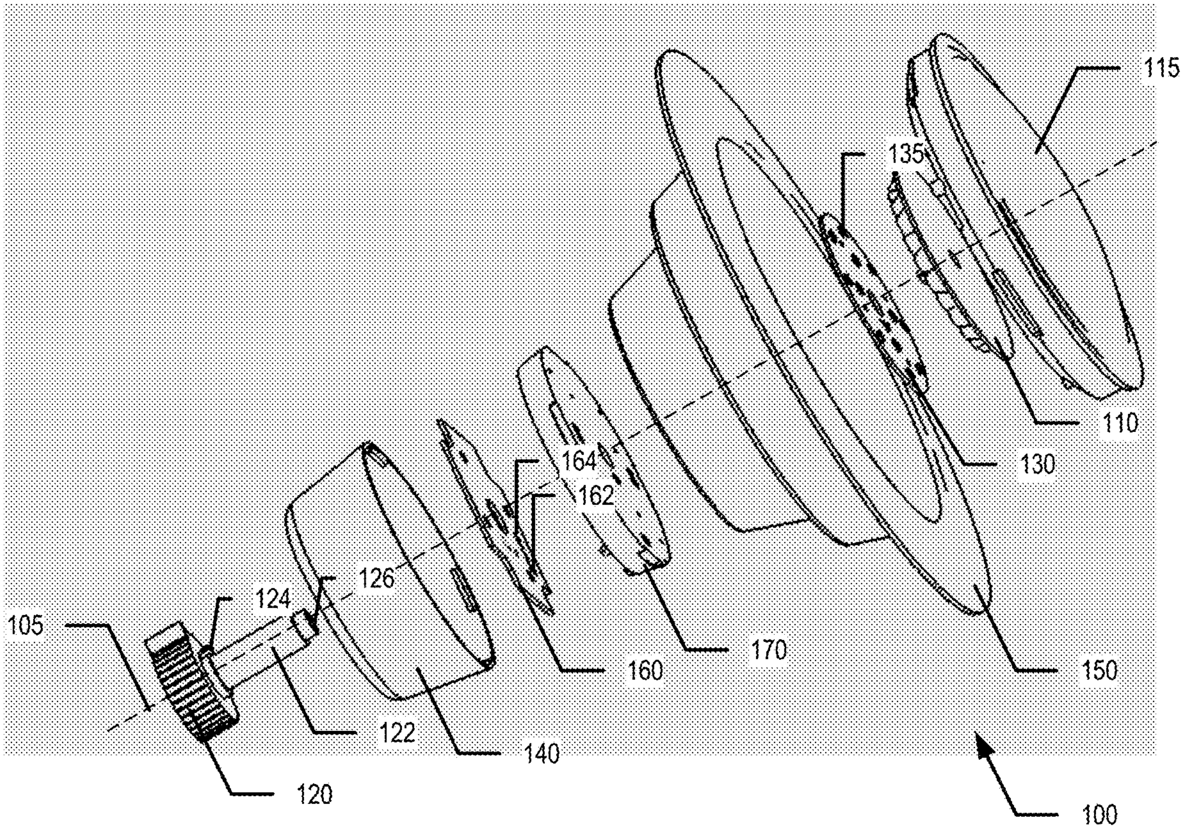
FIG. 4 is an exploded view of an example retrofit lighting device, in accordance with an example embodiment of the present invention.

FIGS. 2, 3, and 4 provide various views of an example retrofit lighting device 100 in accordance with an example embodiment of the present invention. In various embodiments, an example retrofit lighting device 100 may be flush mounted to a mounting surface 50, within a recessed lighting receptacle, and/or the like. In an example embodiment, a retrofit lighting device 100 comprises one or more torsion springs 145, clips, and/or the like configured to retain the retrofit lighting device 100 within a recessed lighting receptacle and/or the like within a mounting surface 50 (e.g., wall, ceiling, and/or the like). In an example embodiment, a retrofit lighting device 100 may comprise at least one set of electrical connecting wires 148 for connecting the electrical components of the retrofit lighting device 100 (e.g., control unit, driver circuitry, and/or the like) to line voltage. For example, a set of electrical connecting wires may be configured to be directly connected to line voltage wires (e.g., wires from a junction box using wire nuts and/or the like), connected to line voltage wires using a quick connect connector, connected to line voltage using a lamp base connector (e.g., A15, A19, A21, A22, B8, B10, C7, C9, C11, C15, F10, F15, F20 and/or traditional/standard lamp size base) configured to be mechanically secured within a socket of a recessed lighting receptacle, and/or the like.

In various embodiments, the retrofit lighting device 100 comprises a housing comprising a base housing 140 and a frame housing 150. In an example embodiment, the retrofit lighting device 100 comprises a lamp envelope 115 configured to enclose an opening in the frame housing 150 in a semi-transparent, transparent, and/or translucent fashion. Together, the base housing 140, the frame housing 150, and/or the like envelope 115 define an interior cavity of the retrofit lighting device 100. One or more light engines may be mounted within the interior cavity of the retrofit lighting device 100. In an example embodiment, the one or more light engines may comprise one or more LED packages 135. For example, in an example embodiment one or more LED packages 135 are mounted to an LED board 130 that is mounted to and/or in thermal communication with a heat sink 170. In an example embodiment, driver circuitry 162 (e.g., mounted on a component board 160), a heat sink 170, and/or other components may be mounted within the housing and/or within the interior cavity of the retrofit lighting device 100. In an example embodiment, a processing element 164 (e.g., mounted on a component board 160) may be mounted within the housing and/or within the interior cavity of the retrofit lighting device 100. In an example embodiment, the processing element 164 is configured to control a relay assembly that may be used to determine the current position of a selector 120 (and thereby determine the current position of one or more secondary optic discs) and/or to select a new position of the selector (and thereby select a new position for at least one of the secondary optic discs).

In an example embodiment, the retrofit lighting device 100 comprises a selector 120. For example, the selector 120 may be mounted to the base housing 140 and/or frame housing 150. In an example embodiment, the selector 120 is a rotary switch that may be rotated to select an operating mode (e.g., defined by a beam angle and/or beam profile) in accordance with which the retrofit lighting device 100 will emit light when operated. For example, in an example embodiment, rotation of the selector 120 may cause one or more secondary optical elements to align or unalign with corresponding light engines, such that, when operated, the retrofit lighting device 100 provides a beam of light of a particular beam angle and/or particular beam profile, in accordance with the selected operating mode. For example, in an example embodiment, the retrofit lighting device 100 may comprise one or more complex secondary optics and/or a secondary optic discs 110. For example, a secondary optic disc 110 may comprise one or more secondary optical elements. In an example embodiment, a secondary optic disc 110 may comprise one or more secondary optical elements that are organized into one or more sets. When the secondary optical elements of a set are aligned with the corresponding light engines, the retrofit lighting device 100, when operated, provides a beam of light having the particular beam angle and/or particular beam profile corresponding to the selected operating mode. For example, the selector 120 may be used to select a predetermined operating mode by causing one or more secondary optic discs 110 to be rotated and thereby cause the alignment of the corresponding set of secondary optical elements with the light engine(s) such that, when operated, the retrofit lighting device 100 emits a beam of light of the particular beam angle and/or the particular beam profile, in accordance with the selected operating mode. In one example embodiment, a first secondary optic disc 110 comprises a first set of secondary optical elements and a second secondary optic disc 110 comprises a second set of secondary optical elements. In an example embodiment, a secondary optic disc 110 comprises both a first set and a second set of secondary optical elements. In an example embodiment, one or more secondary optic discs 110 each comprising one or more sets of secondary optical elements may be rotated to align lighting engines of the retrofit lighting device 100 with one or more of the secondary optical elements such that light emitted by the retrofit lighting device 100 is conditioned to have a particular beam angle and/or particular beam profile, in accordance with the selected operating mode. In an example embodiment, the one or more light engines may be one or more light emitting diode (LED) packages. In an example embodiment, one secondary optic disc 110 comprises three sets of secondary optical elements and may be rotated to align one of the three sets of secondary optical elements with the light engines.

Exemplary LED Packages

In example embodiments, the retrofit lighting device 100 may comprise one or more LED packages 135. For example, the one or more light engines of the retrofit lighting device 100 may comprise one or more LED packages 135. In example embodiments, an LED package 135 comprises one or more LED chips, electrical contacts, and optionally phosphor (e.g., to cause the LED package to emit white light). The LED package 135 may further comprise encapsulant to protect the one or more LED chips, wire bonds, and the phosphor. In an example embodiment, the LED packages 135 may comprise one or more alternate current (AC) driven LEDs. In some embodiments, the LED package 135 may further comprise one or more optical elements. For example, the LED package 135 may comprise one or more primary optical elements. In an example embodiment, the one or more of the LED packages 135 may be configured to emit light of at least one of 2700K, 3000K, 3500K, 4000K, 5000K, 5700K, 6000K, 7000K, 7500K and/or other color temperatures, as appropriate for the application.

In example embodiments, the one or more LED packages 135 may be in electrical communication with driver circuitry 162 such that the one or more LED packages 135 may be operated by the driver circuitry 162. For example, the driver circuitry 162 may provide a controlled electrical current to at least one of the LED packages 135. In example embodiments, the one or more LED packages 135 may be configured to provide light that varies in brightness, color temperature, CRI, and/or the like based on the current provided to the one or more LED packages 135 by the driver circuitry 162. For example, the driver circuitry may provide a particular current to an LED package 135 to cause the LED package 135 to provide light having particular light aspects or qualities.

In example embodiments, the LED packages 135 may comprise one or more LED packages 135 that are configured to emit light other than "white" light. For example, the LED packages 135 may comprise one or more LED packages 135 configured to emit a red or amber light that may be operated to increase the CRI of the light emitted by the retrofit lighting device 100.

Exemplary Driver Circuitry

In example embodiments, the driver circuitry 162 may be configured to provide a controlled electrical current to at least one of the LED packages 135 during operation of the retrofit lighting device 100. In various embodiments, the driver circuitry 162 may comprise a circuit portion configured to convert AC voltage into DC voltage. In some embodiments, the driver circuitry 162 may comprise a circuit portion configured to control the current flowing through the one or more LED packages 135. In certain embodiments, the driver circuitry 162 may comprise a circuit portion configured to dim the retrofit lighting device 100. In an example embodiment, the driver circuitry 162 may be configured to provide a particular current to one or more of the LED packages 135 to provide light having specific light aspects qualities (e.g., brightness, color temperature, CRI, and/or the like). For example, the driver circuitry 162 may be configured to drive one or more LED packages 135 such that the LED packages provide light having the desired light aspects or qualities. In various embodiments, additional circuit components may be present in the driver circuitry 162. Similarly, in various embodiments, all or some of the circuit portions mentioned here may not be present in the driver circuitry 162. In some embodiments, circuit portions listed herein as separate circuit portions may be combined into one circuit portion. As should be appreciated, a variety of driver circuitry configurations are generally known and understood in the art and any of such may be employed in various embodiments as suitable for the intended application, without departing from the scope of the present invention.

Exemplary Secondary Optic Disc

Figure 5A:
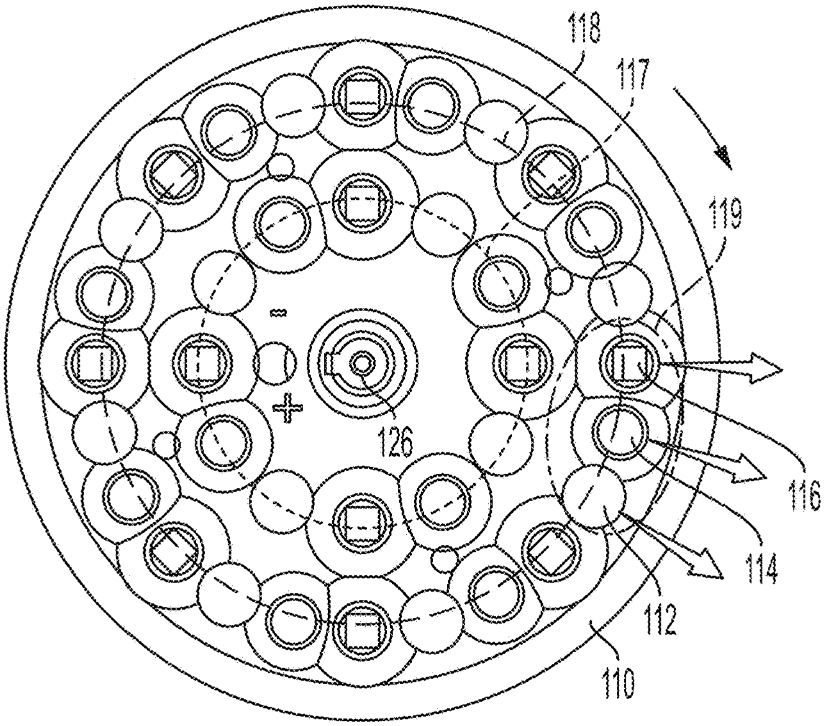
FIGS. 5A and 5B are front views of an example secondary optics disc, in accordance with an example embodiment of the present invention.
Figure 5B:
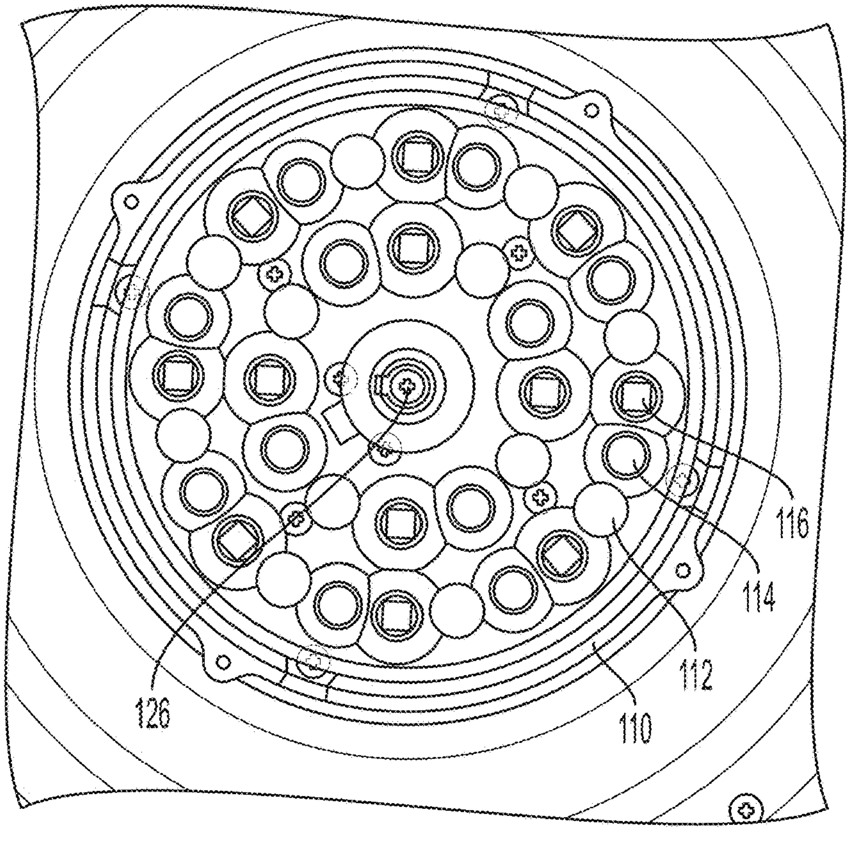

FIGS. 5A and 5B illustrate example embodiments of a secondary optic disc 110. In an example embodiment, the retrofit lighting device 100 comprises one or more secondary optic discs 110. In an example embodiment, the retrofit lighting device 100 comprises only one secondary optic disc 110. In an example embodiment, a secondary optic disc 110 may be a disc comprising one or more secondary optical elements (e.g., 112, 114, 116). For example, the secondary optical elements may be embedded in and/or secured to the secondary optic disc 110. In an example embodiment, the secondary optic disc 110 comprises a plurality of secondary optical elements, each optical element being one of two or more types. In an example embodiment, the plurality of secondary optical elements (e.g., 112, 114, 116) are organized into groups 119, wherein each group 119 corresponds to a light engine (e.g., LED package 135) of the retrofit lighting device 100. Each group 119 may comprise secondary optical elements of two or more types. For example, a group 119 may comprise a first secondary optical element 112 of a first type, a second secondary optical element 114 of a second type, and a third secondary optical element 116 of a third type. An operating mode may correspond to a particular secondary optical element of each group 119 being aligned with the corresponding light engine for that group 119. For example, a secondary optical element of a first type may be configured to condition the light incident thereon into a beam of light having a first beam angle and a secondary optical element of a second type may be configured to condition the light incident thereon into a beam of light having a different, second beam angle.

In an example embodiment, one or more secondary optic discs comprises one or more groups or portions of one or more groups of secondary optical elements (e.g., 112, 114, 116). For example, each group of secondary optical elements may correspond to a light engine (e.g., an LED package 135). For example, for the secondary optic disc 110 illustrated in FIGS. 5A and 5B, each group of secondary optical elements comprises a secondary optical element of each of a first type, a second type, and a third type. For example, group 119 comprises of a first secondary optical element 112 of a first type, a second type of secondary optical element 114 of a second type, and a third secondary optical element 116 of a third type. When the secondary optic disc 110 is positioned such that the first secondary optical element 112 is aligned with the corresponding light engine, a light beam of a first beam angle is provided when the lighting device 100 is operated. When the secondary optic disc 110 is positioned such that the second secondary optical element 114 is aligned with the corresponding light engine, a light beam of a second beam angle is provided when the lighting device 100 is operated. Similarly, when the secondary optic disc 110 is positioned such that the third secondary optical element 116 is aligned with the corresponding light engine, a light beam of a third beam angle is provided when the lighting device 100 is operated. The first, second, and third beam angles may be different angles. For example, the first beam angle may be 100°, the second beam angle may be 60°, and the third beam angle may be 40°.

In an example embodiment, one or more secondary optic discs 110 may be configured such that if one first secondary optical element 112 is aligned with the corresponding light engine, then each light engine is aligned with a corresponding first secondary optical element 112. For example, the secondary optic disc(s) 110 may be configured to condition the light emitted by the retrofit lighting device 100 to be a beam having a beam profile similar to that shown in FIG. 6A, wherein the hash mark on the horizontal axis indicates the position of the center of the retrofit lighting device 100. For example, as shown in the illustrated example beam profile, the intensity and/or amount of light across the emitted light beam may be a generally constant and/or uniform across a diameter of the light beam.

In an example embodiment, a first secondary optic disc 110 may comprise a first plurality of secondary optical elements corresponding to a first plurality of light engines and a second secondary optic disc 110 may comprise a second plurality of secondary optical elements corresponding to a second plurality of light engines. For example, the first plurality of light engines may comprise an inner ring of light engines with the corresponding first plurality of secondary optical elements 117 comprising an inner ring of secondary optical elements (e.g., 112, 114, 116) and the second plurality of light engines may comprise an outer ring of light engines with the corresponding second plurality of secondary optical elements 118 comprising an outer ring of secondary optical elements (e.g., 112, 114, 116). Thus, the first secondary optic disc 110 may be positioned to define the beam angle of an inner portion of the light beam emitted by the retrofit lighting device 100 and the second secondary optic disc 110 may be positioned to define the beam angle of an outer portion of the light beam emitted by the retrofit lighting device 100. For example, as shown by the example beam profile of FIG. 6B, the beam profile may not be uniform or constant across a diameter of the beam.

Thus, a retrofit lighting device 100 may comprise one or more secondary optic discs 110 comprising one or more secondary optical elements (e.g., 112, 114, 116). The secondary optical elements are embedded in and/or disposed on the secondary optic disc 110 such that a group 119 of secondary optical elements corresponds to a light engine. The secondary optical elements may come in two or more types. Each type of secondary optical element is configured to condition the light incident thereon into a light beam of a particular, predefined beam angle. A group 119 of secondary optical elements may comprise an optical element of each type. For example, in one embodiment, a group 119 of secondary optical elements corresponding to particular light engine may comprise a first secondary optical element 112 of a first type, a second secondary optical element 114 of a second type, and a third secondary optical element 116 of a third type. Each of the first, second, and third type of secondary optical elements are configured to condition the light incident thereon into a predefined beam angle (e.g., a first, second, or third beam angle, wherein the first, second, and third beam angle are different). In an example embodiment, the groups 119 of secondary optical elements are positioned on and/or in the secondary optic disc 110 such that one secondary optical element of each group 119 may be aligned with the corresponding light engine at the same time. For example, a first secondary optical element 112 of a first group 119 may be aligned with a first light engine at the same time that a first secondary optical element 112 of a second group 119 is aligned with a second light engine. In another example, a first secondary optical element 112 of a first group 119 may be aligned with a first light engine at the same time that a second secondary optical element 114 of a second group 119 is aligned with a second light engine, if appropriate for the selected operating mode. In various embodiments, the secondary optic disc(s) 110 may be configured to cause the retrofit lighting device 100 to provide a light beam of one or more beam profiles and/or one or more beam angles as appropriate for the intended application.

As noted above, one or more secondary optic discs 110 may be mounted to the retrofit lighting device 100 such that a secondary optic disc 110 may be rotated with respect to the housing and/or the one or more light engines mounted within the housing of the retrofit lighting device 100. For example, the retrofit lighting device 100 may comprise a selector 120 that is mounted to an axle 122. For example, the secondary optic disc 110 may be affixed, secured, and/or the like to an end 126 of the axle 122. For example, the secondary optic disc 110 may be secured and/or affixed to the end 126 using a mechanical fastener, adhesive, and/or the like. For example, the secondary optic disc 110 may be secured and/or affixed to the end 126 of the axle 122 such that when the selector 120 is rotated, thereby causing the axle 122 to rotate, the secondary optic disc 110 is rotated.

In an example embodiment, the axle 122 is generally aligned with the optical axis 105 of the retrofit lighting device 100. For example, the axle 122 may extend through one or more holes in various components of the retrofit lighting device 100 (e.g., LED board 130, component board 160, heat sink 170) along the optical axis 105 of the retrofit lighting device 100. In an example embodiment, rotation of the selector 120 may cause rotation of the axle 122 via a gear assembly, one or more belts, and/or combination thereof. For example, if the selector 120 is not mounted along the optical axis 105 of the retrofit lighting device 100, a gear assembly and/or the like may be used to cause rotation of the secondary optic disc 110. For example, the secondary optic disc 110 may be configured to rotate about the optical axis 105 of the retrofit lighting device 100. For example, if the retrofit lighting device 100 comprises two or more secondary optic discs 110 that may be rotated independently, one or more gear assemblies and/or the like may be employed to control the rotation of one or more of the secondary optic discs 110 with respect to the light engines. In an example embodiment, the selector 120 is directly affixed to the axle 122 and thus rotation of the selector 120 directly causes rotation of the secondary optic disc 110.

Exemplary Selector

In an example embodiment, the retrofit lighting device 100 comprises a selector 120. The selector 120 may be positioned in one of a plurality of positions to select an operating mode defined by a particular beam angle and/or a beam profile of the beam emitted by the retrofit lighting device 100 during operation thereof. For example, dial indicators 125 may be positioned on the base housing 140, for example, proximate the selector 120 such that a user may use the selector 120 to select a particular operating mode, beam angle, and/or beam profile. In an example embodiment, the selector 120 may be rotated to select a predetermined operating mode (e.g., a predefined beam angle and/or beam profile). In another embodiment, various other types of selectors may be used (e.g., slide selectors, set of binary switches, electro-mechanical switch, and/or the like) as appropriate for the application.

In an example embodiment, as shown in FIG. 4, the secondary optic disc(s) 110 may be secured and/or affixed to an end 126 of an axle 122 that extends along the optical axis 105 of the retrofit lighting device 100. The selector 120 may be operably connect, secured, and/or affixed to the axle 122 such that the movement of the selector 120 causes the rotation of the axle 122 to a selected rotational position. For example, rotation of the selector 120, in the case of the selector 120 being dial or other rotational switch, may cause the axle 122 to be rotated either through a direct connection of the axle 122 to the selector 120 and/or through a gear and/or belt assembly and/or the like. In an example embodiment, positioning teeth 124 may be affixed to the selector 120 and/or the axle 122 such that the selector 120 (and therefore the secondary optic disc(s) 110) may be positioned in a first predetermined position. For example, the one or more positioning teeth 124 may be affixed to the selector 120 and/or axle 122 such that a change in position of the selector 120 and/or a rotation of the axle 122 causes a corresponding change in position of the positioning teeth 124. For example, one or more positioning teeth 124 may be configured to aid in manual and/or automatic selection of one of a plurality of predetermined positions (e.g., as indicated by the dial indicators), wherein each position corresponds to a particular operating mode, and/or to maintain the selection of a predetermined position when the selector 120 experiences minor bumps and/or jostling during the mounting of the retrofit lighting device 100, for example. Each predetermined position corresponds to the one or more secondary optic disc(s) 110 being in a predetermined position such that a pre-selected secondary optical element (e.g., 112, 114, 116) of each group 119 is aligned with the corresponding light engine such that, when operated, the retrofit lighting device 100 provides a beam of light of a predefined beam angle and/or profile. For example, each predetermined position corresponds to the one or more secondary optic discs) 110 being in a predetermined position such that each secondary optical element of the set of secondary optical elements corresponding to the user selected operating mode is aligned with the corresponding light engine.

In an example embodiment, the position of the selector 120 may be changed (e.g., rotated from a first position to a second position, and/or the like) by manually moving the selector 120. In an example embodiment, a relay assembly may engage the positioning teeth 124 to determine the current position of the selector 120 and/or axle 122 (and therefore the secondary optic disc(s) 110) and/or to cause the selector 120 and/or the axle 122 (and therefore the secondary optic disc(s) 110) to change positions to another predetermined position. In an example embodiment, the relay assembly is in communication with a processing element 164 configured to determine the current position of the selector 120, axle 122, and/or secondary optic disc(s) 110 based on information/data received from the relay assembly (e.g., based on the position of the relay assembly and/or the positioning teeth 124) and/or to cause rotation of the axle 122 by the relay assembly via the positioning teeth 124. Thus, the selector 120 and/or the positioning teeth 124 may provide for manually selecting an operating mode (e.g., a beam angle and/or beam profile) of the retrofit lighting device 100. Similarly, the positioning teeth 124 and a relay assembly may provide for automatic adjustment of the beam angle and/or profile of the retrofit lighting device based on a user-selected operating mode (e.g., via a wired and/or wireless remote switch).

Exemplary Control Unit

In an example embodiment, the retrofit lighting device 100 may comprise a control unit comprising a processing element 164, communications interface 168, memory 161, and/or the like, as shown in FIGS. 7 and 10. In an example embodiment, the processing element 164 may be configured to cause the driver circuitry 162 to operate the one or more light engines (e.g., LED packages 135). In an example embodiment, the processing element 164 may be configured to operate a relay assembly 166 and determine the current position of the selector 120, axle 122, positioning teeth 124, and/or the secondary optic disc(s) 110. In an example embodiment, the processing element 164 may be configured operate, drive and/or the like a relay assembly 166 to cause the selection of a predetermined position of the selector 120, axle 122, positioning teeth 124, and/or the secondary optic disc(s) 110 corresponding to a user-selected operating mode (e.g., beam angle and/or profile). In an example embodiment, the processing element 164 may be configured to operate, drive, and/or the like a relay assembly 166 to toggle through a series of predetermined positions of the selector 120, axle 122, positioning teeth 124, and/or the secondary optic disc(s) 110.

In an example embodiment, the processing element 164 is a microcontroller unit (MCU). For example, the processing element 164 may comprise a single integrated circuit. In an example embodiment, the processing element 164 may be in communication with one or more memory elements, one or more communications interfaces 168, and/or the like. In example embodiments, the processing element 164 may be configured to receive signals from the remote wired and/or wireless switch (e.g., 200, 300).

In example embodiments, the one or more processing elements 164 (also referred to as processors, processing circuitry, processing device, and/or similar terms used herein interchangeably) that communicate with other elements of the retrofit lighting device 100. For example, the processing element(s) 164 may communicate with the memory element(s), relay assembly 166, communication interface element(s) 168, and/or components of the driver circuitry 162 via direct electrical connection, a bus, and/or the like. For example, the processing element(s) 164 may be configured to process input received through the relay assembly 166 (and/or additional user interface components), process a signal received from a wireless remote switch 200 (e.g., through the communication interface element 168), process a signal received from the wired remote switch 300, operate the relay assembly 166 to cause a mechanical change in the position of the selector 120, axle 122, positioning teeth 124, and/or secondary optic disc(s) 110, and/or the like. As will be understood, the processing element 164 may be embodied in a number of different ways. For example, the processing element 164 may be embodied as one or more complex programmable logic devices (CPLDs), microprocessors, multi-core processors, co-processing entities, application-specific instruction-set processors (ASIPs), microcontrollers, and/or controllers. Further, the processing element 164 may be embodied as one or more other processing devices or circuitry. The term circuitry may refer to an entirely hardware embodiment or a combination of hardware and computer program products. Thus, the processing element 164 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 164 may be configured for a particular use or configured to execute instructions stored in volatile or non-volatile media or otherwise accessible to the processing element 164. As such, whether configured by hardware or computer program products, or by a combination thereof, the processing element 164 may be capable of performing steps or operations according to embodiments of the present invention when configured accordingly.

As described elsewhere herein, the processing element 164 may be configured to operate a relay assembly 166 such that the relay assembly acts as the mechanical interface between the processing element 164 and the selector 120, axle 122, and/or secondary optic disc(s) 110. While the mechanical interface for adjusting the beam operating mode (e.g., causing rotation of the selector 120, axle 122, and/or secondary optic disc(s) 110) as being a relay assembly in some example embodiments, in other example embodiments the mechanical interface for adjusting the beam operating mode may be a mosfet, bipolar junction transistor (BJT), or any integrated circuit appropriate for the application. For example, various mechanical interfaces may be used to operate a motor and/or the like configured to cause rotation of the selector 120, axle 122, and/or second optic disc(s) 110 to switch between operating modes. For example, in one example embodiment, the processing element 164 itself may act as the mechanical interface and directly drive a motor and/or the like configured to cause rotation of the selector 120, axle 122, and/or second optic disc(s) 110 to switch between operating modes.

The memory element(s) 161 may be non-transitory and may include, for example, one or more volatile and/or non-volatile memories. In other words, for example, the memory element may be an electronic storage device (e.g., a computer readable storage medium) comprising gates configured to store data (e.g., bits) that may be retrievable by a machine (e.g., a computing device like the processing element 164). The memory element may be configured to store information, data, content, applications, instructions, or the like for enabling the processing element 164 to carry out various functions in accordance with an example embodiment of the present invention. For example, the memory element could be configured to buffer input data for processing by the processing element 164 (e.g., a signal received from the remote switch 200, 300). Additionally or alternatively, the memory element could be configured to store instructions for execution by the processing element 164.

As indicated, in one embodiment, the processing element 164 may be in communication with one or more communications interface elements 168 for communicating with the wireless remote switch 200. For example, the communications interface element 168 may be configured to receive a signal from the wireless remote switch 200 indicating user selection of, activation of, and/or interaction with an on/off or power button, a dimmer switch, or a remote selector switch configured to select or modify the beam angle and/or profile provided by the retrofit lighting device 100, when operated, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the communications interface element 168 may be configured to communicate via a wireless communication technology, such as a short range communication technology. For example, the communications interface element 168 may be configured to receive and/or send signals using IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Exemplary Wireless Remote Switch

As shown in FIG. 7, example embodiments of the present invention comprise a wireless remote switch 200. In an example embodiment, the wireless remote switch 200 may be a handheld device (e.g., a remote control, or computing entity 200') that is within the same room as the retrofit lighting device 100, within a short range communication technology range of the retrofit lighting device 100, in communication with the processing element 164 and/or communications interface 168 through a wireless network, and/or the like. In an example embodiment, a wireless remote switch 200 is any device, computing entity, and/or the like configured to wirelessly communicate with the retrofit lighting device 100 (e.g., via the communications interface 168). For example, the wireless remote switch 200 may be configured to communicate with the retrofit lighting device 100 via a short range communication technology and/or through a wired and/or wireless network 250. For example, the wireless remote switch 200 may communicate with the retrofit lighting device 100 using low energy Bluetooth, through a Wi-Fi network, and/or the like. For example, the wireless remote switch 200 may be configured to communicate with the retrofit lighting device 100 using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the communications interface 48 may be configured to communicate via a wireless communication technology, such as a short range communication technology. For example, the communications interface 48 may be configured to receive and/or send signals using IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

In an example embodiment, an application operating on the wireless remote switch 200 may be configured to provide a user interface that may allow a user operating the wireless remote switch 200 to provide user-input causing the retrofit lighting device 100 to turn on and/or off, control of a brightness level of the retrofit lighting device 100 (e.g., act as a dimmer switch), cause the changing of the beam angle and/or profile from a first pre-defined beam angle and/or profile to a second pre-defined beam angle and/or profile. For example, the user may operate the wireless remote switch 200 to switch the retrofit lighting device from providing a beam of light in accordance with a first operating mode to providing a beam of light in accordance with a second operating mode.

FIG. 8 provides an illustrative schematic representative of a computing entity 200' that can be used in conjunction with embodiments of the present invention. For example, the computing entity 200' may be used as a wireless remote switch 200 in an example embodiment. In particular, the computing entity 200' may be configured to operate and/or execute an application configured to cause the computing entity 200' to act as a remote switch 200. For example, the computing entity 200' may operate and/or execute an application configured to communicate with the processing element 164 (e.g., via the communications interface 168) and/or cause one or more aspects (e.g., beam angle, beam profile, and/or the like and/or a combination thereof) of light emitted by the retrofit lighting device 100 to be modified. In example embodiments, the computing entity 200' may be a mobile computing entity such as a mobile phone, tablet, phablet, wearable computing device, personal digital assistant (PDA), MP3 player, and/or the like.

As shown in FIG. 8, a computing entity 200' can include an antenna 212, a transmitter 204 (e.g., radio), a receiver 206 (e.g., radio), and a processing device 208 that provides signals to and receives signals from the transmitter 204 and receiver 206, respectively. The signals provided to and received from the transmitter 204 and the receiver 206, respectively, may include signaling information/data in accordance with an air interface standard of applicable wireless systems to communicate with various entities, such as processing element 164 (e.g., via the communications interface 168), another computing entity 200', and/or the like. In this regard, the computing entity 200' may be capable of operating with one or more air interface standards, communication protocols, modulation types, and access types. More particularly, the computing entity 200' may operate in accordance with any of a number of wireless communication standards and protocols. In a particular embodiment, the computing device 200' may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the computing entity 200' can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 200' can also download changes, add-ons, and updates, for instance, to its firmware, software (e.g., including executable instructions, applications, program modules), and operating system.

According to one embodiment, the computing entity 200' may include location determining aspects, devices, modules, functionalities, and/or similar words used herein interchangeably. For example, the computing entity 200' may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the computing entity's 200' position in connection with a variety of other systems, including cellular towers, Wi-Fi access points, and/or the like. Similarly, the computing entity 200' may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The computing entity 200' may also comprise a user interface (that can include a display 216 coupled to a processing device 208) and/or a user input interface (coupled to a processing device 208). For example, the user interface may be an application, browser, user interface, dashboard, webpage, and/or similar words used herein interchangeably executing on and/or accessible via the computing entity 200' to interact with and/or cause display of information. The user input interface can comprise any of a number of devices allowing the computing entity 200' to receive data, such as a keypad 218 (hard or soft), a touch display, voice/speech or motion interfaces, scanners, readers, or other input device. In embodiments including a keypad 218, the keypad 218 can include (or cause display of) the conventional numeric (0-9) and related keys (#, *), and other keys used for operating the computing entity 200' and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 200' can collect contextual information/data in addition to receiving user input.

The computing entity 200' can also include volatile storage or memory 222 and/or non-volatile storage or memory 224, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 200'.

Exemplary Method of Changing Operating Mode of Retrofit Lighting Device with Wireless Remote Switch FIG. 9 provides a flowchart illustrating processes and procedures for changing a beam angle and/or profile of a retrofit lighting device using a wireless remote switch 200, according to an example embodiment. Starting at block 262, a user and/or installer may select a particular operating mode for the retrofit lighting device 100. For example, the user and/or installer may use the selector 120 to manually select an operating mode (e.g., a particular beam angle and/or a particular beam profile) for the light beam emitted by the retrofit lighting device 100 when operated. For example, the user and/or installer may use one or more selectors 120 to cause one or more secondary optic discs 110 to be positioned such that a set of secondary optical elements (e.g., 112, 114, 116) configured to provide the desired beam angle and/or beam profile is aligned with the corresponding light engines. For example, the secondary optical element (e.g., 112, 114, 116) of each group 119 of secondary optical elements corresponding to the selected operating mode (e.g., beam angle and/or beam profile) is aligned with the corresponding light engine (e.g., LED package 135).

At block 264, the retrofit lighting device 100 is installed. For example, an electrical connection between the electrical connecting wires 148 and line voltage is made and the retrofit lighting device 100 is mechanically secured within a mounting surface 50. For example, the torsion springs 145 may be used to mechanically secure the retrofit lighting device 100 into a recessed lighting receptacle.

At block 272, an operating mode request is received, at some time after the installation of the retrofit lighting device 100. For example, a user operating a wireless remote switch 200 may provide user input indicating a desired change in the operating mode (e.g., beam angle and/or beam profile) of the light beam emitted by the retrofit lighting device 100 during operation thereof. For example, the user may provide input via a user interface of the wireless remote switch 200 selecting a predefined beam angle and/or profile; indicating that the user would like a beam profile that is more uniform, more centrally focused, and/or the like; indicating that the user would like a larger or smaller beam angle; and/or the like. The wireless remote switch 200 may then provide (e.g., transmit) an operating mode request indicating the user input. The retrofit lighting device 100 may then receive the operating mode request (e.g., via the communications interface 168).

At block 274, the current relay assembly 166 position may be determined. For example, the processing element 164 may receive the operating mode request (e.g., via the communications interface 168) and, in response thereto, process the operating mode request. In response to processing the operating mode request, the processing element 164 may determine a current relay assembly 166 position. For example, the processing element 164 may determine the current position of the relay assembly 166 and/or use the relay assembly 166 to determine the current position of the positioning teeth 124 and therefore to determine the current operating mode (e.g., beam angle and/or profile) of the retrofit lighting device 100. In an example embodiment, the goal relay assembly position corresponding to the user selected operating mode (e.g., as indicated by the operating mode request) may be determined. Once the current relay assembly 166 position and/or the goal relay assembly position are determined, and/or in response thereto, the change and/or adjustment required to place the relay assembly 166 in the position required to operate the retrofit lighting device 100 in accordance with the operating mode request is determined. For example, the processing element 164 may determine the change and/or adjustment required to position the relay assembly 166 (and therefore the secondary optic disc(s) 110) in the position(s) required to operate the retrofit lighting device 100 in accordance with the operating mode request. For example, it may be determined that the relay assembly 166 is in a first position and that in order to operate the retrofit lighting device 100 in accordance with the operating mode request, it is required that the relay assembly 166 be in a second position. As described above, a relay assembly is an example of a mechanical interface that may be used in an example embodiment. Various other embodiments may incorporate various other mechanical interfaces as appropriate for the application.

At block 276, the relay assembly 166 causes a gear assembly and/or axle 122 to rotate, thereby causing rotation of the secondary optic disc(s) 110. For example, the position of the relay assembly 166 may be changed, adjusted, driven, and/or the like from the first position to the second position. For example, the processing element 164 may control and/or drive the relay assembly 166 to rotate, for example, from a first position to a second position, in accordance with the operating mode request. For example, the processing element 164 may be configured to actuate and/or drive a motor configured to cause the mechanical movement of the relay assembly. For example, the changing, adjusting, driving and/or the like of the relay assembly 166 from the first position to the second position, may cause the secondary optic disc(s) 110 to be rotated into a position wherein a beam having a beam angle and/or beam profile in accordance with the user-selected operating mode is provided by the retrofit lighting device 100. Although the use of the wireless remote switch 200 is described above as being operated by a user to select a particular operating mode (e.g., pre-defined beam angle and/or beam profile), in an example embodiment, a wireless remote switch 200 may be used to toggle through a set of predetermined operating modes (e.g., predefined beam angles and/or beam profiles) of the retrofit lighting device 100.

Exemplary Wired Remote Switch

An example wired remote switch 300 is illustrated in FIG. 10. In example embodiments, a wired remote switch 300 may be a wall-mounted switch mounted in the same room as the retrofit lighting device 100, a toggle switch in wired communication with the retrofit lighting device 100, and/or the like. For example, a wired remote switch 300 may be a switch that controls the flow of electrical power to the retrofit lighting device 100. For example, the wired remote switch 300 may be a wall and/or junction box mounted toggle switch, dimmer switch, and/or the like in wired communication with the retrofit lighting device 100 (e.g., the processing element 164). For example, a wired remote switch 300 may be an existing light switch wired such that the light switch controls the flow of electricity through the circuit through which the retrofit lighting device 100 is powered. For example, the wired remote switch 300 may be configured to control the operation of the retrofit lighting device 100 or aspects thereof by providing a signal to the retrofit lighting device 100 (e.g., processing element 164) indicating user selection, interaction, and/or the like with one or more interactive elements 305 of the wired remote switch 300. For example, the wired remote switch 300 may be configured to allow a user to toggle through two or more operating modes (e.g., pre-defined beam angles and/or profiles) of the retrofit lighting device 100. In example embodiments, the toggling of the wired remote switch 300 to change or modify the operating light aspects or qualities could be at any time interval from 1 millisecond to 1 min.

For example, the wired remote switch 300 may be configured to cause the retrofit lighting device 100 to turn on or off, control the brightness of the retrofit lighting device 300 (e.g., through a dimmer switch), change the operating mode (e.g., beam angle and/or beam profile) of the retrofit lighting device 100, and/or the like. In example embodiments, the wired remote switch 300 comprises one or more interactive elements 305. For example, the one or more interactive elements 305 of the wired remote switch 300 may comprise an on/off toggle switch, dimmer switch configured to turn the retrofit lighting device 100 on/off and/or control the brightness of the light beam emitted by the retrofit lighting device 100. The one or more interactive elements 305 of the wired remote switch 300 may comprise a remote selector specifically configured for receiving user input regarding toggling through and/or selecting one of the two or more operating modes (e.g., predefined beam angle and/or profile) of the retrofit lighting device 100. In example embodiments, the remote selector may be a slide, push button, rotary, passive infrared and/or other type of interactive element that the user may interact with, select, press, touch, voice activate, and/or the like to toggle through and/or select one of the two or more operating modes of the retrofit lighting device 100.

In an example embodiment, the wired remote switch 300 is a binary wall and/or junction box mounted switch that is wired to control the flow of electric power, voltage, and/or current to the retrofit lighting device 100. The processing element 164 of the retrofit lighting device 100 may be configured to detect a rapid toggling of the interactive element 305 of the binary switch based on pulses of electric power, voltage, and/or current received by the processing element 164 based on the toggling of the switch. For example, if the interactive element 305 of the wired remote switch 300 is switched on/off/on in a time interval of a length between approximately 1 millisecond and 1 min, the processing element 164 may receive and/or detect the pulses of electric power, voltage, and/or current and, in response thereto, cause the relay assembly to cause the mechanical movement of the selector 120, axle 122, positioning teeth 124, a gear and/or belt assembly, and/or the secondary optic disc(s) 110 from a first position, to an adjacent second position. For example, if the retrofit lighting device 100 is configured to provide a light beam of three possible beam angles (e.g., a first beam angle, a second beam angle, and a third beam angle), the relay assembly may cause the selector 120, axle 122, positioning teeth 124, a gear assembly, and/or the secondary optic disc(s) 110 to mechanically shift from a current first position corresponding to the first beam angle to a second position corresponding to the second beam angle. Similarly, if the current first position corresponds to the second beam angle, the relay assembly may cause the selector 120, axle 122, positioning teeth 124, a gear assembly, and/or the secondary optic disc(s) 110 to mechanically shift from a current first position corresponding to the second beam angle to a second position corresponding to the third beam angle. Similarly, if the current first position corresponds to a the third beam angle, the relay assembly may cause the selector 120, axle 122, positioning teeth 124, a gear assembly, and/or the secondary optic disc(s) 110 to mechanically shift from a current first position corresponding to the third beam angle to a second position corresponding to the first beam angle.

In an example embodiment, the remote switch 300 may further comprise a communication interface. In example embodiments, the communication interface may be a part of a control unit that is similar to the control unit of the retrofit lighting device 100 (e.g., the control unit of the wired remote switch 300 may comprise a processing element and/or memory element in addition to the communication interface). In example embodiments, the communication interface of the wired remote switch 300 is configured to provide a signal to the communication interface 168 of the retrofit lighting device 100 indicating user selection and/or interaction with the interactive element 305, and/or the like. For example, the communications interface of the wired remote switch 300 may be similar to that of the wireless remote switch 200 and/or a computing entity 200' that may be used as a wireless remote switch 200.

Exemplary Method of Changing Operating Mode of Retrofit Lighting Device with Wired Remote Switch FIG. 11 provides a flowchart illustrating processes and procedures for changing the operating mode (e.g., beam angle and/or beam profile) of a retrofit lighting device 100 using a wired remote switch 300, according to an example embodiment. Starting at block 302, a user and/or installer may select a particular operating mode for the retrofit lighting device 100. For example, the user and/or installer may use the selector 120 to manually select a particular beam angle and/or profile for the light beam emitted by the retrofit lighting device 100 when operated. For example, the user and/or installer may use one or more selectors 120 to cause one or more secondary optic discs 110 to be positioned such that a secondary optical element (e.g., 112, 114, 116) configured to provide the desired beam angle and/or profile is aligned with the corresponding light engine. For example, the secondary optical element (e.g., 112, 114, 116) of each group 119 of secondary optical elements corresponding to the selected operating mode (e.g., beam angle and/or beam profile) is aligned with the corresponding light engine (e.g., LED package 135).

At block 304, the retrofit lighting device 100 is installed. For example, an electrical connection between the electrical connecting wires 148 and line voltage is made and the retrofit lighting device 100 is mechanically secured within a mounting surface 50. For example, the electrical connecting wires 148 may be connected to line voltage such that the wired remote switch 300 is in electrical communication with the control unit (e.g., processing element 164) of the retrofit lighting device 100, in an example embodiment. For example, the torsion springs 145 may be used to mechanically secure the retrofit lighting device 100 into a recessed lighting receptacle. For example, the retrofit lighting device 100 may be in electrical communication with a circuit that is controlled via a wall-mounted toggle switch, and/or the like.

At block 312, a toggling of the interactive element 305 of the wired remote switch 300 is detected, at some time after the installation of the retrofit lighting device 100. For example, a user operating a wired remote switch 300 may toggle the interactive element 305 of the wired remote switch 300 two or more times within a time interval within the range of 1 millisecond and 1 min to provide user input indicating a desired change in the operating mode (e.g., beam angle and/or beam profile) of the light beam emitted by the retrofit lighting device 100 when operated. For example, if the user toggles the wired remote switch 300 on/off/on within 30 seconds, an operating mode toggle may be triggered in an example embodiment. For example, the processing element 164 may detect the pulse(s) of electric power, voltage, and/or current and/or the break and/or interruption in the provided electric power, voltage, and/or current and trigger an operating mode toggle.

At block 314, in response to the triggering of the operating mode toggle, the position of the relay assembly may be adjusted, modified, updated, and/or the like to cause the toggling of the operating mode (e.g., beam angle and/or beam profile) of the retrofit lighting device 100. For example, the relay assembly 166 may be operated and/or driven by the processing element 164 to cause a gear and/or belt assembly and/or axle 122 to rotate (e.g., via engaging the positioning teeth 124), thereby causing rotation of the secondary optic disc(s) 110. For example, the position of the relay assembly 166 may be changed and/or adjusted from the first position to the second position. For example, the relay assembly 166 may be driven by the processing element 164 to cause the relay assembly to cause the mechanical movement of the selector 120, axle 122, positioning teeth 124, a gear assembly, and/or the secondary optic disc(s) 110 from a first position, to an adjacent second position. For example, if the retrofit lighting device 100 is configured to provide a light beam of three possible beam angles (e.g., a first beam angle, a second beam angle, and a third beam angle), the relay assembly may cause the selector 120, axle 122, positioning teeth 124, a gear and/or belt assembly, and/or the secondary optic disc(s) 110 to mechanically shift from a current first position corresponding to the first beam angle to a second position corresponding to the second beam angle. Similarly, if the current first position corresponds to the second beam angle, the relay assembly may cause the selector 120, axle 122, positioning teeth 124, a gear and/or belt assembly, and/or the secondary optic disc(s) 110 to mechanically shift from a current first position corresponding to the second beam angle to a second position corresponding to the third beam angle. Similarly, if the current first position corresponds to a the third beam angle, the relay assembly may cause the selector 120, axle 122, positioning teeth 124, a gear and/or belt assembly, and/or the secondary optic disc(s) 110 to mechanically shift from a current first position corresponding to the third beam angle to a second position corresponding to the first beam angle. In an example embodiment, the processing element 164 may determine the current relay assembly 166 position before driving the relay assembly 166 (e.g., via a motor) to cause the relay assembly 166 to the rotation and/or other mechanical movement of the selector 120, axle 122, positioning teeth 124, a gear and/or belt assembly, and/or the secondary optic disc(s) 110 from a current first position to an adjacent second position. As described herein, a wired remote switch 300 may be used to toggle through two or more operating modes of the retrofit lighting device 100. However, in an example embodiment, the remote switch 300 may be used to provide an operating mode request to the retrofit lighting device 100, as described above with respect to the wireless remote switch 200. As described above, a relay assembly is an example of a mechanical interface that may be used in an example embodiment. Various other embodiments may incorporate various other mechanical interfaces as appropriate for the application.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A lighting device or lamp comprising:

a plurality of light engines distributed in a ring arrangement;

at least one secondary optic disc comprising a plurality of secondary optical elements, the plurality of secondary optical elements comprising at least two types of secondary optical elements;

a housing, wherein the plurality of light engines are mounted within the housing; and a selector positioned exterior to the housing and configured to rotate the secondary optical element, the selector comprising two or more predetermined selector positions, each position corresponding to alignment of at least a portion of the plurality of light engines with a corresponding type of secondary optical element of the at least two types of secondary optical elements, wherein:

a center point of the ring arrangement and a center point of the secondary optic disc define an optical axis of the lighting device or lamp, the ring arrangement and the at least one secondary optic disc are rotatable with respect to one another about the optical axis, alignment of at least the portion of the plurality of light engines with secondary optical elements of a first type of the at least two types of secondary optical elements causes light emitted by the lighting device or lamp to have at least one of a first beam angle or a first beam profile in a plane that is transverse to a direction of propagation of the light, alignment of at least the portion of the plurality of light engines with secondary optical elements of a second type of the at least two types of secondary optical elements causes the light emitted by the lighting device or lamp to have at least one of a second beam angle or a second beam profile in the plane that is transverse to the direction of propagation of the light, and the first beam angle is different from the second beam angle and the first beam profile is different from the second beam profile.

2. The lighting device or lamp of claim 1, wherein the selector is operably connected to an axle, the axle being affixed to the secondary optic disc such that movement of the selector from a first selector position of the two or more selector positions to a second selector position of the two or more selector positions causes rotation of the secondary optic disc with respect to the ring arrangement from a first position corresponding to the alignment of at least a portion of the plurality of light engines with the secondary optical elements of the first type to a second position corresponding to the alignment of at least a portion of the plurality of light engines with the secondary optical elements of the second type.

3. The lighting device or lamp of claim 2, wherein the axle is affixed directly to the selector, and wherein the selector is positioned on the optical axis.

4. The lighting device or lamp of claim 2, wherein the axle is operably connected to the selector via (a) a gear assembly, (b) one or more belts, or (c) a combination of one or more gears and one or more belts.

5. The lighting device or lamp of claim 1, wherein the plurality of secondary optical elements are organized into groups of secondary optical elements, each group of secondary optical elements (a) comprising two or more types of secondary optical elements and (b) corresponding to one of the plurality of light engines.

6. The lighting device or lamp of claim 5, wherein each group of secondary optical elements comprises one secondary optical element of the first type, one secondary optical element of the second type, and one secondary optical element of a third type.

7. The lighting device or lamp of claim 5, wherein each type of secondary optical elements of the two or more types of secondary optical elements corresponds to a predefined beam angle.

8. The lighting device or lamp of claim 1, wherein the at least two types of secondary optical elements comprises three types of secondary optical elements.

9. The lighting device or lamp of claim 8, wherein (a) the secondary optical elements of the first type correspond to a first beam angle, the secondary optical elements of the second type correspond to a second beam angle, and the secondary optical elements of a third type of the three types of secondary optical elements correspond to a third beam angle, (b) the first beam angle is within a predefined angle from the range of 5 to 45°, (c) the second beam angle is within a predefined angle from the range of 35 to 80°, and (d) the third beam angle is within a predefined angle from the range of 70-120°.

10. The lighting device or lamp of claim 1, wherein the selector comprises positioning teeth that are configured to maintain a selected position of the two or more predetermined selector positions.

11. The lighting device or lamp of claim 10, wherein the one or more positioning teeth are configured to rotate with the selector.

12. The lighting device or lamp of claim 1, wherein at least one of the plurality of light engines is mounted within the housing such that light emitted by the at least one of the plurality of light engines is emitted in a direction toward the secondary optic disc.

13. The lighting device or lamp of claim 1, wherein an axis of the housing is aligned with the optical axis of the lighting device or lamp.

14. The lighting device or lamp of claim 1, wherein each optical element of the first type is neighbored by at least one optical element of the second type.

15. The lighting device or lamp of claim 1, wherein the secondary optical elements of the first type are a different size than the secondary optical elements of the second type.

16. The lighting device or lamp of claim 1, wherein the ring arrangement and the at least one secondary optic disc are rotatable with respect to one another about the optical axis while the lighting device or lamp is being operated to emit light.

17. The lighting device or lamp of claim 1, wherein each light engine comprises at least one light emitting diode (LED).

18. The lighting device or lamp of claim 1, wherein the selector is a rotary switch that is configured to be rotated between each of the two or more predetermined selector positions.

19. The lighting device or lamp of claim 1, wherein the selector is positioned on the housing.

20. The lighting device or lamp of claim 1, wherein the selector is mounted to the housing.

* * * * *